(12) United States Patent
Jackson et al.

(10) Patent No.: US 11,251,578 B2
(45) Date of Patent: Feb. 15, 2022

(54) OUTPUT COUPLING FROM UNSTABLE LASER RESONATORS

(71) Applicant: KERN TECHNOLOGIES, LLC, Wadena, MN (US)

(72) Inventors: Paul E Jackson, Wadena, MN (US); Aaron M Kern, Wadena, MN (US)

(73) Assignee: KERN TECHNOLOGIES, LLC, Wadena, MN (US)

( * ) Notice: Subject to any disclaimer, the term of this patent is extended or adjusted under 35 U.S.C. 154(b) by 9 days.

(21) Appl. No.: 17/009,462

(22) Filed: Sep. 1, 2020

(65) Prior Publication Data

US 2021/0083447 A1 Mar. 18, 2021

(30) Foreign Application Priority Data

Sep. 12, 2019 (EP) .................................... 19196887

(51) Int. Cl.
*H01S 3/08* (2006.01)
*H01S 3/03* (2006.01)
*H01S 3/223* (2006.01)

(52) U.S. Cl.
CPC ........ *H01S 3/08081* (2013.01); *H01S 3/0315* (2013.01); *H01S 3/08068* (2013.01); *H01S 3/2232* (2013.01)

(58) Field of Classification Search
CPC .............. H01S 3/0818; H01S 3/08081; H01S 3/08059–08068
See application file for complete search history.

(56) References Cited

U.S. PATENT DOCUMENTS 3,873,942 A * 3/1975 Reilly ................. H01S 3/08081
372/95
4,117,319 A * 9/1978 White, III ........... G01B 11/272
250/201.1

(Continued)

FOREIGN PATENT DOCUMENTS

DE   19516791 A1 * 11/1996 ............. H01S 3/041
EP   2053708 A1 *  4/2009 ......... G02B 27/0988

(Continued)

OTHER PUBLICATIONS

G. McAllister, W. Steier and W. Lacina in "Improved mode properties of unstable resonators with tapered reflectivity mirrors and shaped apertures"; IEEE Journal of Quantum Electronics, pp. 346-355, vol. 10, Issue 3, Mar. 1974 (1974).

(Continued)

*Primary Examiner* — Joshua King
(74) *Attorney, Agent, or Firm* — Law Office Of Michael Antone; Michael Antone

(57) ABSTRACT

A laser resonator comprising a specially designed front mirror 32. The front mirror 32 together with a rear mirror form a resonator cavity. As well as having a resonator cavity reflective surface 42, the front mirror 32 also has an output coupling reflective surface 44 which forms a continuation of the resonator cavity reflective surface 42 and extends at an angle thereto so as to direct a beam laterally out of the cavity. The output coupling reflective surface 44 and the resonator cavity reflective surface 44 are joined by a "soft" rounded edge 40 of arcuate cross-section, this rounded transition suppressing diffraction ripples that would otherwise be generated if the edge were "hard", i.e. sharp.

14 Claims, 12 Drawing Sheets

(56) References Cited

U.S. PATENT DOCUMENTS

| | | | | |
|---|---|---|---|---|
| 4,310,808 | A * | 1/1982 | Byer | H01S 3/08036 372/101 |
| 4,327,129 | A | 4/1982 | Sepp | |
| 4,477,909 | A | 10/1984 | Salvi et al. | |
| 4,858,240 | A | 8/1989 | Pohler et al. | |
| 4,953,175 | A | 8/1990 | De Silvestri et al. | |
| 5,260,964 | A | 11/1993 | Morin et al. | |
| 5,283,692 | A | 2/1994 | Herbst | |
| 5,299,220 | A | 3/1994 | Brown et al. | |
| 5,327,449 | A * | 7/1994 | Du | H01S 3/08081 372/108 |
| 5,392,309 | A * | 2/1995 | Nishimae | H01S 3/08081 372/103 |
| 5,848,091 | A * | 12/1998 | Mombo Caristan | B23K 26/06 372/103 |
| 6,215,807 | B1 | 4/2001 | Reilly | |
| 6,442,186 | B1 * | 8/2002 | Vitruk | H01S 3/0315 372/23 |
| 9,099,836 | B2 | 8/2015 | Nowak et al. | |
| 2004/0105477 | A1 * | 6/2004 | Dutov | H01S 3/0385 372/55 |
| 2005/0069008 | A1 * | 3/2005 | Xin | H01S 3/0305 372/64 |
| 2007/0133643 | A1 | 6/2007 | Seguin | |
| 2008/0205475 | A1 * | 8/2008 | Chenausky | H01S 3/0818 372/95 |
| 2009/0110016 | A1 | 4/2009 | Rofin-Sinar | |
| 2015/0318662 | A1 * | 11/2015 | Nguyen | H01S 3/08059 372/19 |

FOREIGN PATENT DOCUMENTS

| | | | | |
|---|---|---|---|---|
| GB | 2276031 A | * | 9/1994 | H01S 3/08081 |
| JP | 62124790 A | * | 6/1987 | H01S 3/034 |
| JP | 05183217 | | 7/1993 | |
| JP | 06112556 | | 4/1994 | |
| JP | 0786667 | | 3/1995 | |
| JP | 2700822 B2 | * | 1/1998 | H01S 3/0315 |
| WO | WO-9115045 A1 | * | 10/1991 | H01S 3/0315 |

OTHER PUBLICATIONS

C. Santana and L. B. Felsen in "Mode losses in unstable resonators with rounded edges"; Appl. Opt. 17, pp. 2239-2243 (1978).

Xiao, Qin, Tang, Wan, Li, and Zhonget in "Beam shaping characteristics of an unstable-waveguide hybrid resonator"; Appl. Opt. vol. 53, Issue 10, pp. 2213-2219 (2014).

Pargmann, Hall et al "Off-axis negative-branch unstable resonator in rectangular geometry", Appl. Opt. vol. 50, Issue 1, pp. 11-16 (2011), XP001559709, ISSN: 0003-6935, DOI: 10.1364/A0.50.000011.

* cited by examiner

OUTPUT COUPLING FROM UNSTABLE LASER RESONATORS

FIELD OF THE INVENTION

The present disclosure relates generally to unstable laser resonators and more especially to the output coupling in such laser resonators.

BACKGROUND

There are various known options for designing the output mirror of an unstable laser resonator. A standard option is to use a hard- or sharp-edged mirror for the output mirror which is smaller in cross-section than the intracavity beam cross-section so that a desired proportion of the beam away from the principal optical axis passes out of the cavity beyond the lateral edges of the output mirror.

FIGS. 1A and 1B of the accompanying drawings show schematically in plan and side view respectively an unstable resonator cavity laser 10 with a hard-edged output mirror 32 according to a known design, namely a one-sided negative-branch hybrid-unstable cavity of a slab waveguide laser. The laser cavity is of length 'L' as defined by a rear mirror 30 and a front (output) mirror 32. The slab is formed by a first electrode 12 and a second electrode 14 having respective first and second mutually facing surfaces 22, 24 that are spaced apart by a gap of thickness 't'. The electrodes 12, 14 each have a width 'Ws' and a length 'Ls'. The gap is dimensioned to allow a plasma discharge of a gas, shown schematically with the stippling 18, to be formed by applying a radio frequency, RF, electrical drive signal to at least one of the electrodes 12 and 14. The gas, or more precisely its plasma discharge, forms the gain medium for the laser. The resonator cavity mirrors 30 and 32 have respective radii of curvature 'R1' and 'R2'. The rear mirror 30 is of width 'W1'. The front mirror 32 (output mirror) is of width W2'. The cavity's optical axis O/A is off center by a distance 'dc' so that the rear mirror 30 has an extension on the output beam side of the optical axis O/A of 'a' and an extension on the side distal the output beam 35 of 'M×a', where M is the magnification of the unstable resonator formed by mirrors 30 and 32. The relative sizes of front and rear mirrors 30, 32 in the direction perpendicular to the optical axis and in the plane of the slab and the off-center arrangement of the front mirror 32 leaves a gap of width 'g' for the output beam 35 to exit the cavity. The end of the front mirror 32 that laterally bounds the side of the output beam 35 proximal to the optical axis 'O/A' has an abrupt, hard edge 40. Moreover, the mirror substrate 46 is terminated with an undercut surface 44, so that the angle θ<90°, i.e. is an acute angle, where the angle (90°−θ)=ρ is termed the rake angle and is usually a few degrees. For example, θ=85° (ρ=5°) is typical. The undercut of surface 44 aims to ensure that the mirror substrate 46 does not interfere with the output beam as it exits the cavity. A laser design of the kind illustrated in FIGS. 1A and 1B is disclosed, for example, in the prior art examples of JPH05183217A. Undercut hard edges are also used in rotationally symmetric designs of resonator cavity for the output mirror, e.g. as shown in JPH0786667A. Instead of leaving a gap for coupling out on one side of the unstable resonator cavity's front reflector as in the design of FIGS. 1A and 1B, a variant is to make the front reflector from two or more separate sections and arrange the sections so there are one or more slit-shaped gaps between them through which the output beam passes for coupling out (see U.S. Pat. No. 6,215,807B1).

It is well known that a hard-edged output mirror as illustrated is a source of edge diffraction, and that this edge diffraction has in general a remarkably and pronounced deleterious effect on the resonator mode properties and the output beam quality. The edge 40 of the front mirror 32 that laterally bounds one side of the output beam 35 is a source of edge diffraction, as schematically shown by the ray traces in FIG. 1A emanating from the edge 40, which propagate both back into the resonator cavity and forward into the output beam.

Another well-known approach to couple out light from an unstable resonator cavity is to use a so-called scraper mirror. The scraper mirror is a mirror that is positioned in the cavity tilted at an angle of usually 45 degrees. The scraper mirror has an elliptical hole to pass the majority of the beam power through for amplification between the cavity end mirrors while "scraping off" a portion of the beam power from the circulating intracavity beam through reflection from the rim portion of the mirror that borders the hole. An example of a scraper mirror design is disclosed in FIG. 3 of U.S. Pat. No. 4,327,129A (Sepp). A scraper mirror also has a hard edge, i.e. the edge of the hole.

In the literature, to address this problem various design modifications are disclosed either to do away with the hard edge or to suppress its effects.

One of these approaches is to use a variable or graded reflectivity mirror (VRM/GRM) which presents a graded reduction in reflectivity from the principal optical axis outwards. This approach was first proposed by G. McAllister, W. Steier and W. Lacina in "Improved mode properties of unstable resonators with tapered reflectivity mirrors and shaped apertures"; IEEE Journal of Quantum Electronics (Volume 10, Issue 3, March 1974); pages 346-355. FIG. 1C shows an example laser design of this kind with a GRM as the output mirror. This example design is from JPH06112556A. A laser medium 11 is situated between a circular rear mirror 30 and a circular front, output mirror 32. The output mirror 32 has a graded reflectivity from a peak at the optical axis reducing by 13.5% with radial distance away from the optical axis. The design is said to be applicable to a positive or a negative branch unstable resonator. Other example patents that disclose a laser with a GRM as the output mirror are U.S. Pat. Nos. 4,858,240A, 4,953,175A, 5,260,964A, and 5,299,220A. Graded reflectivity is realized using special coating techniques and U.S. Pat. No. 5,283,692A discusses this topic. While VRMs/GRMs can be used for lower powers and shorter wavelengths, e.g. Nd:YAG lasers in the 1 micrometer output range, for high power lasers, e.g. $CO_2$ lasers emitting in the 10 micrometer range, the higher absorbance caused by the reduced reflectivity would cause rapid mirror coating burnout, so is not practical. The present inventors are unaware of any commercially available $CO_2$ slab waveguide lasers that use a GRM for the output mirror.

Another approach is that first proposed by C. Santana and L. B. Felsen in "Mode losses in unstable resonators with rounded edges"; Appl. Opt. 17, 2239-2243 (1978). Santana & Felsen proposed rounding the edges of the output mirror. FIG. 1D is a schematic cross-section of a rounded-edge output mirror 32 according to the prior art design principles of Santana & Felsen that could be used as the output mirror in the one-sided negative-branch resonator of FIGS. 1A and 1B. The output mirror 32 has a radius of curvature R2. The end 40 of the output mirror 32 which bounds the output beam is rounded with a cylindrical edge having a radius of curvature Re, where calculations for various ratios of R2/Re in the range 5 to 100 were simulated by Santana & Felsen in the above-referenced article. The output beam 35 thus has a tangential intersection with the radial edge of the output mirror 32 which is followed by an undercut surface 44. The principal effect of edge rounding is that the rounded edge produces a low-loss detached mode (i.e. a mode that is not loss-degenerate with a competing mode) that is not found in the sharp-edged configuration and mode discrimination is improved. This means that eigenmode loss separation between the low loss detached mode and the next higher order modes is increased, resulting in an output beam of higher quality. It is not known whether rounded edge output mirrors have ever become commercially available. However, especially for high power applications, there is a practical issue that it may be difficult to coat the rounded edge evenly to ensure that it is fully reflective and non-absorbing over all of its area that receives significant beam power.

Another approach is proposed in U.S. Pat. No. 4,477,909A (Salvi & Smithers) who proposed modifying a spherical convex or concave output mirror by incorporating a step to cancel out the hard-edge-generated diffraction ripples. FIG. 1E is a schematic cross-section of a spherical concave output mirror 32 according to Salvi & Smithers with the output beam 35 exiting as a doughnut-shaped mode around the edges of the mirror. Here a physical step 41 is incorporated in the output mirror 32 slightly radially inwards of its hard edges 40. The step is formed by an abrupt thinning of the output mirror 32.

Another approach is proposed in JPH05183217A (Kuniaki & Nobutaka) who recognize the problem that the forward propagating diffraction ripples from the hard edge, as shown in FIG. 1A, cause local heating near the hard edge. This local heating distorts the output mirror in this region and so changes the geometry of the resonator cavity, thereby making it difficult to maintain a constant laser output power and mode quality. FIG. 1F is a schematic plan view showing their solution, which is to increase the rake angle ρ so that it is greater than the maximum angle ν of forward propagation of diffraction ripples. The extreme undercut prevents the forward-propagating diffraction ripples from heating the edge region of the output mirror resulting in more stable operation.

A more general way to overcome poor beam quality is to pass an output beam through a beam-shaping optical system that includes spatial filtering. Such as system is described by Xiao, Qin, Tang, Wan, Li, and Zhonget in "Beam shaping characteristics of an unstable-waveguide hybrid resonator"; Appl. Opt. Vol. 53, Issue 10, pages 2213-2219 (2014). A beam-shaping optical system of this kind can be used inter alia to filter the output beam from a laser with a hard-edged output mirror in order to remove higher-order mode content and diffraction ripples. Using such a system for the slab resonator of FIGS. 1A and 1B, the beam quality in the unstable resonator width direction can be improved to make it match that in the slab waveguide height direction. It is usual to include "crossed" telescopes with different magnifications in the beam width and height directions. The telescopes may be magnifying or de-magnifying Keplarian or Galilean types with independent primary and secondary lenses or mirrors, or common spherical or aspherical lenses or mirrors. If the Keplarian type is used, then an aperture stop may be placed in-between the primary and secondary lenses or mirrors to spatial filter higher-order modal content and diffraction ripples content superimposed on the beam and improve beam quality. However, a beam-shaping optical system of this kind introduces power losses and power instability as well as adding significant complexity and cost.

BRIEF SUMMARY OF THE INVENTION

According to one aspect of the disclosure, there is provided a laser resonator comprising a front mirror and a rear mirror with respective resonator cavity reflective surfaces. The front and rear mirrors in cooperation form an unstable resonator cavity that has a principal optical axis. The front mirror further comprises an output coupling reflective surface which forms a continuation of the front mirror's resonator cavity reflective surface and a curved reflective surface having a rounded edge that forms a transition between the front mirror's resonator cavity surface and the output coupling reflective surface. An output beam direction is defined by reflection from the output coupling reflective surface. The beam reflected from the output coupling reflective surface is thus coupled out of the resonator cavity. In other words, the output coupling reflective surface performs the output coupling, i.e. performs the role of an output coupler, by reflecting out a portion of the intracavity circulating radiation from the resonator cavity. The rounded edge provides a smooth transition between the front mirror's resonator cavity surface and the output coupling reflective surface, thus suppressing the formation of diffraction ripples.

In some embodiments, the front mirror's resonator cavity and output coupling reflective surfaces are joined by a single curved reflective surface, so that the rounded edge joins the front mirror's resonator cavity reflective surface and the curved reflective surface. In other embodiments, the front mirror's resonator cavity and output coupling reflective surfaces are joined by a plurality of curved reflective surfaces, the or each pair of adjacent curved reflective surfaces being joined by an intermediate reflective surface facet.

The proposed output mirror design is suitable for a variety of resonator types. It is suitable for concave, convex resonator output mirrors and confocal resonators. It is suitable for negative or positive branch resonators. It is suitable for unstable resonators including unstable-unstable resonators which are unstable in both cavity cross-section axes, and hybrid resonators, such as waveguide slab resonators, which are stable is one cavity cross-sectional axis and unstable in another. It is suitable for one-sided or two-sided output coupling, as would be the two main options in a slab waveguide laser. It may also be applied to circular or elliptical output mirrors to provide a doughnut-shaped output beam which can then be condensed with suitable mirrors or other optics after its output from the cavity into a circular or elliptical cross-section beam. This can be effected using an axicon mirror arrangement, such as a positive-negative axicon mirror pair as disclosed by Liu, Cline and He in "Laser Acceleration in Vacuum Using a Donut-Shaped Laser Beam", AIP Conf. Proc. No. 472 (AIP, New York, 1999), pp. 592-598, or a toroidal collimating reflector and axicon as used in US2007133643A1 (see FIG. 11 thereof).

In some embodiments, the rounded edge, or in the case of multiple rounded edge one or more of them, is arcuate in cross-section, i.e. the cross-section orthogonal to the edge extension direction is the arc of a circle and so has a defined radius. For example, if the front mirror's resonator cavity reflective surface has a radius of curvature R2 and the relevant rounded edge has a radius of curvature Re, then the ratio R2/Re can be in a range between one thousand and two million; 1 000<R2/Re<2 000 000. In other embodiments, the rounded edge has a varying radius of curvature from the extension of the front mirror's resonator cavity surface to the output coupling reflective surface. The varying radius can lie in a range of radii from a minimum radius to a maximum radius, the range of radii lying, for example, between one thousand and two million; 1 000<R2/Re<2 000 000. The varying radius may vary monotonically around the rounded edge (either increasing or decreasing) from the extension of the front mirror's resonator cavity surface to the output coupling reflective surface.

The output coupling reflective surface can extend at an internal or external angle, θ, to the front mirror's resonator cavity reflective surface which is in a range selected from one of: 135±40°, 135±35°, 135±30°, 135±25°, 135±20°, 135±15°, 135±10°, 135±5°, 135±2° and 135±1°, where an internal angle of 135° is defined as one which provides an output beam direction following reflection from the output coupling reflective surface that is orthogonal to the optical axis of the resonator cavity at the front mirror and away from the optical axis of the resonator cavity at the front mirror, and an external angle of 135° is defined as one which provides an output beam direction following reflection from the output coupling reflective surface that is orthogonal to the optical axis of the resonator cavity at the front mirror and towards the optical axis of the resonator cavity at the front mirror.

The relevant rounded edge can describe an internal or external angle, α, in a range selected from one of: 45±40°, 45±35°, 45±30°, 45±25°, 45±20°, 45±15°, 45±10°, 45±5°, 45±2° and 45±1°. An internal angle would couple the output beam out of the laser outwards in relation to the optical axis, i.e. not crossing the cavity, whereas an external angle would couple the output beam out of the laser inwards in relation to the optical axis, i.e. crossing the cavity.

The limits of the angular ranges for θ and α that are possible will be functionally defined in relation to the cavity and the mechanical design of the laser resonator, so that the reflection from the output coupling reflective surface does successfully couple out. Namely, the angles must be chosen to avoid the beam reflected from the output coupling reflective surface coupling back into the cavity. Moreover, the beam reflected from the output coupling reflective surface must not foul mechanical parts of the laser resonator, such as the housing or, in the case of external angles for θ and α, by hitting the front mirror or other cavity components when the output beam crosses the cavity on its way out of the laser resonator.

In some embodiments, the laser comprises a slab waveguide arranged in the resonator cavity so that the front and rear mirror's resonator cavity reflective surfaces couple at least one resonator mode between the front and rear mirrors and the slab waveguide. For example, the slab waveguide may be arranged in relation to the output coupling reflective surface of the front mirror so that radiation coupled out of the laser via the output coupling reflective surface is laterally confined to be incident upon the output coupling reflective surface and thereby avoid being incident on an outer edge of the output coupling reflective surface.

With a slab design it would be possible to have two separate output coupling reflective surfaces either side of the slab. Namely, the front mirror would comprises a second output coupling reflective surface arranged on the other side of the optical axis at the front mirror compared to the first-mentioned output coupling reflective surface. The second output coupling reflective surface would form a continuation of the front mirror's resonator cavity reflective surface. A curved reflective surface with a rounded edge would be provided for the second output coupling reflective surface to form a transition between the front mirror's resonator cavity surface and the second output coupling reflective surface. With a slab design, the output coupling reflective surface may direct the output to be in the plane of the slab. Alternatively, the output coupling reflective surface may direct the output to be tilted out of the plane of the slab.

In some embodiments, the gain medium of the laser is a gas and the laser further comprises electrodes which are drivable pairwise in use by a radio frequency, RF, drive voltage to discharge an RF electrical current through the gas. The electrodes are arranged to provide a gap between them across which the RF electrical current can be discharged through the gas. A gas of particular interest for the gain medium is carbon dioxide. Other gases of interest include any suitable molecular or atomic gases, or mixtures thereof, e.g. carbon monoxide, helium, nitrogen.

Although embodiments of the invention are detailed below that have a gas as the gain medium, in principle the design principle of the invention is also applicable to other gain media, such as liquids or solids. For example, in other embodiments, the gain medium of the laser may be a crystal, e.g. Nd:YAG (neodymium-doped yttrium aluminum garnet).

BRIEF DESCRIPTION OF THE DRAWINGS

In the following, the present invention will further be described by way of example only with reference to exemplary embodiments illustrated in the figures.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

In this document, we use the following well known terms with their standard definitions, namely:

waveguide: when the slab thickness 't' and slab length 'ls' satisfy the condition $(t/2)^2/(\lambda ls) \ll 1$, where λ is the lasing wavelength.

unstable resonator: a resonator which violates stability condition $0 < g1g2 < 1$ where $$g1 = \left(1 - \frac{L}{R1}\right), g2 = \left(1 - \frac{L}{R2}\right)$$

where L is the cavity length and R1 & R2 are the respective radii of curvature of the end mirrors, R>1 being a concave/converging mirror and R<1 being convex/diverging mirror, and the resonator magnification, M=R1/R2.

negative branch resonator: a resonator with a magnification per round trip of less than minus unity.

positive branch resonator: a resonator with a magnification per round trip of greater than plus unity.

confocal (unstable) resonator: a resonator in which the end mirrors have radii of curvature such that R1+R2=2L.

Figure 1A:
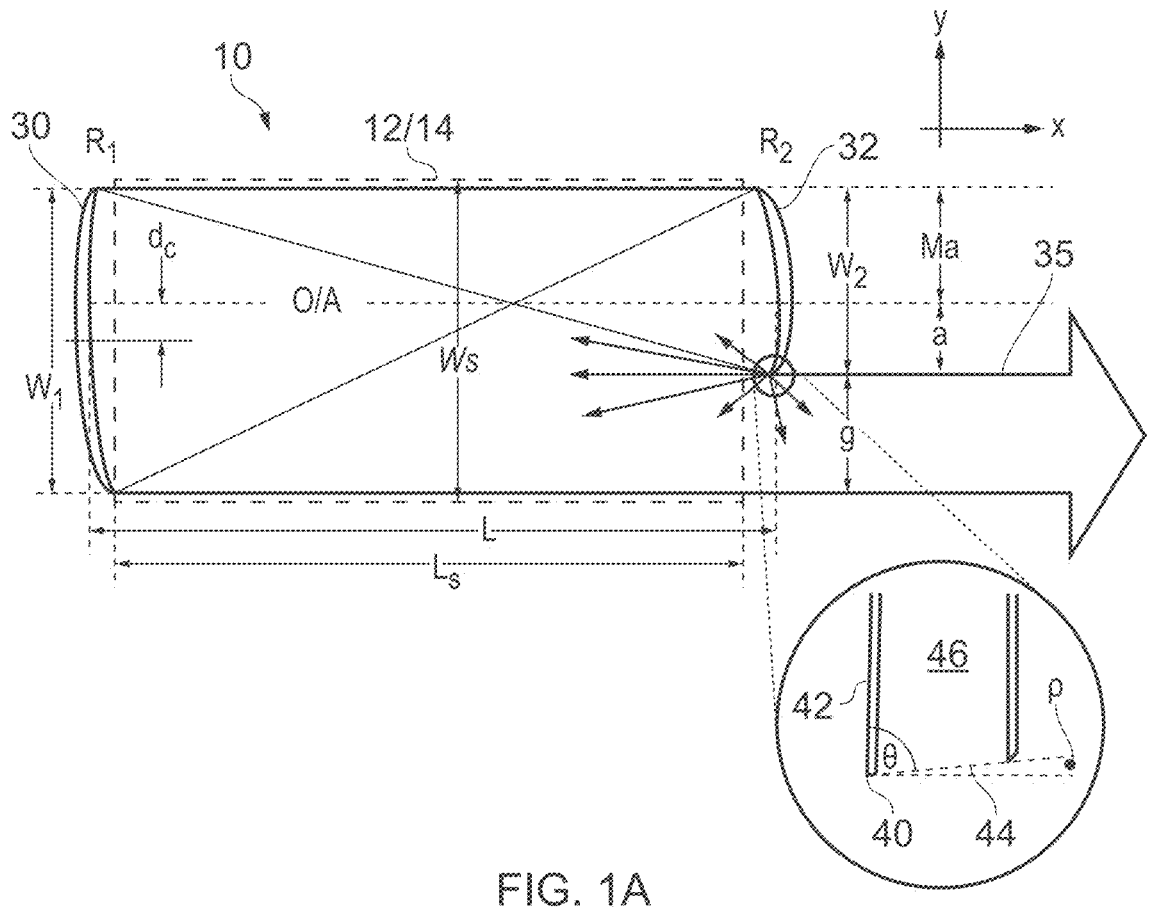
FIGS. 1A and 1B are schematic plan and side views of a slab waveguide laser according to a prior art design with a hard-edged output mirror.
Figure 1B:
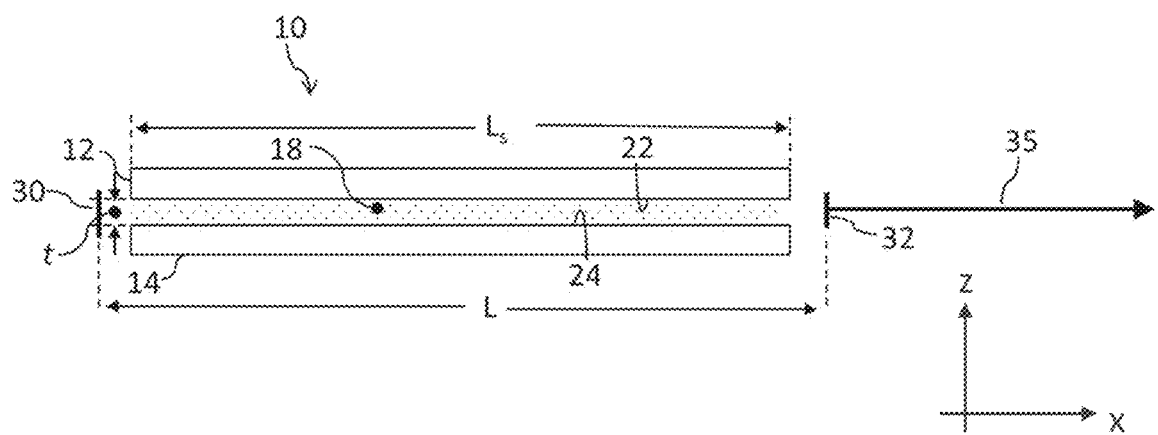
Figure 1C:
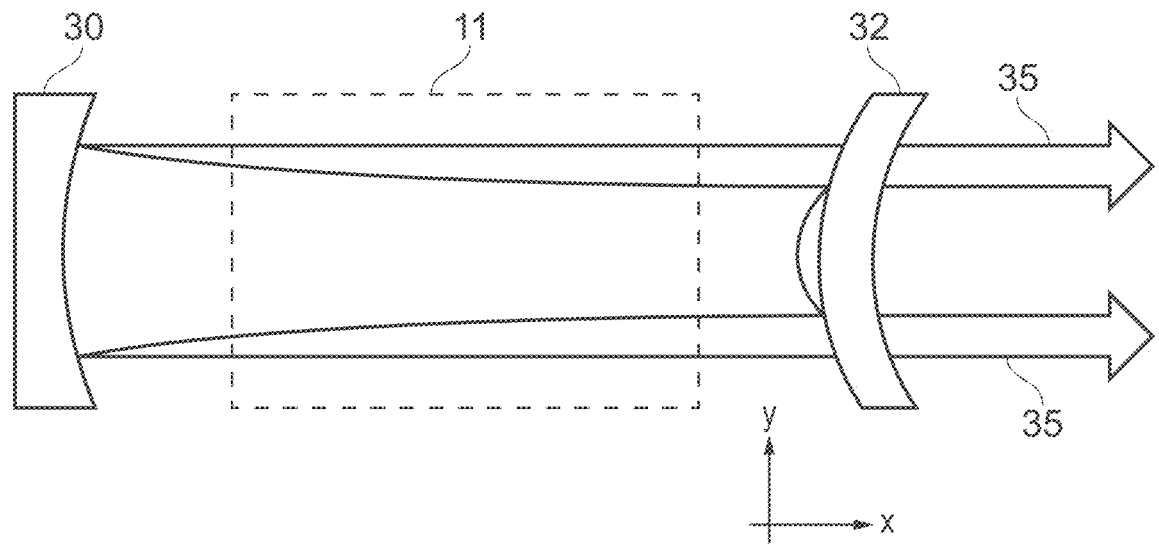
FIG. 1C is a schematic plan view of a laser according to a prior art design with a graded reflectivity output mirror.
Figure 2A:
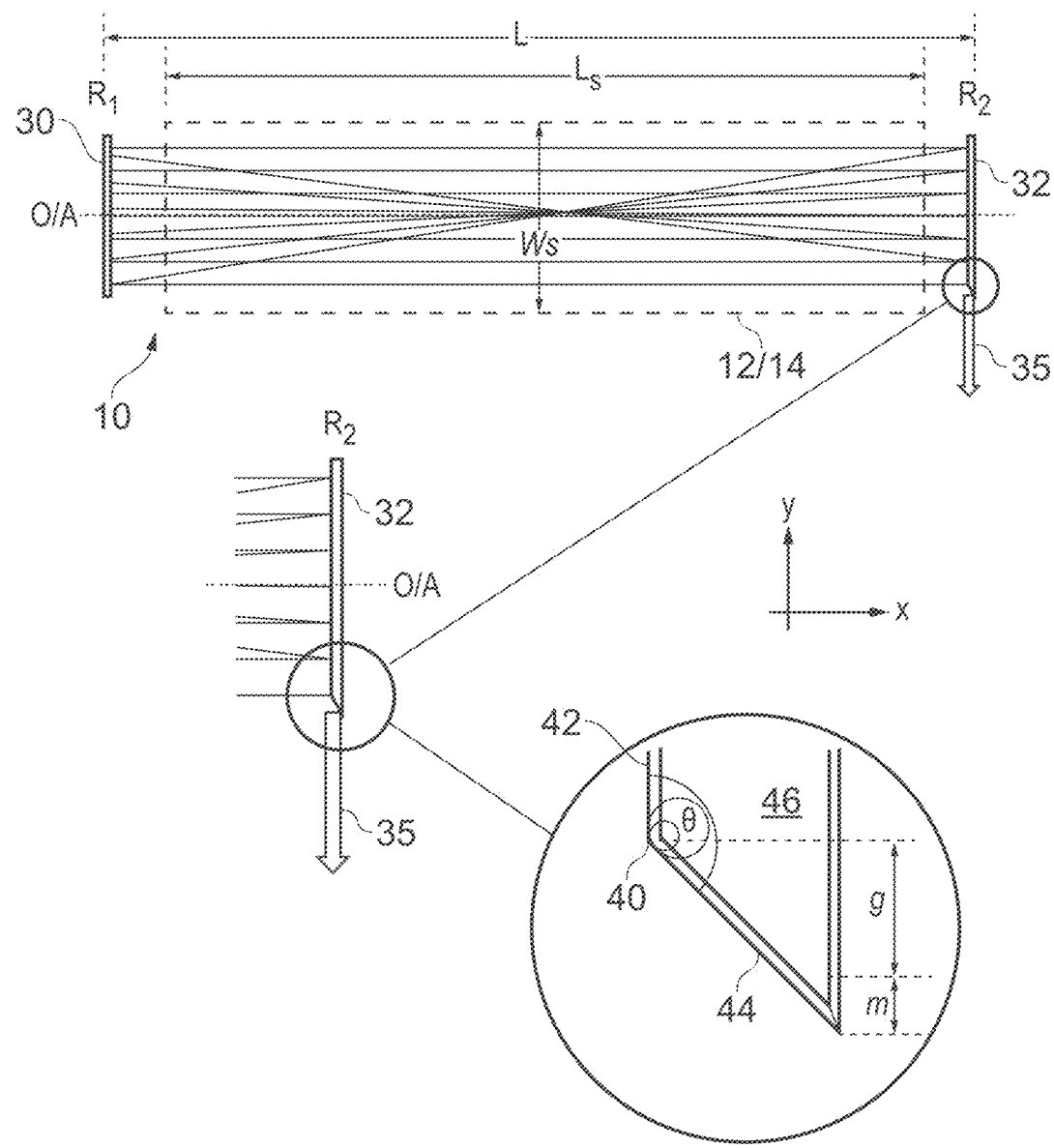
FIGS. 2A and 2B are schematic plan and side views of a slab waveguide laser according to an embodiment of the invention.
Figure 2B:
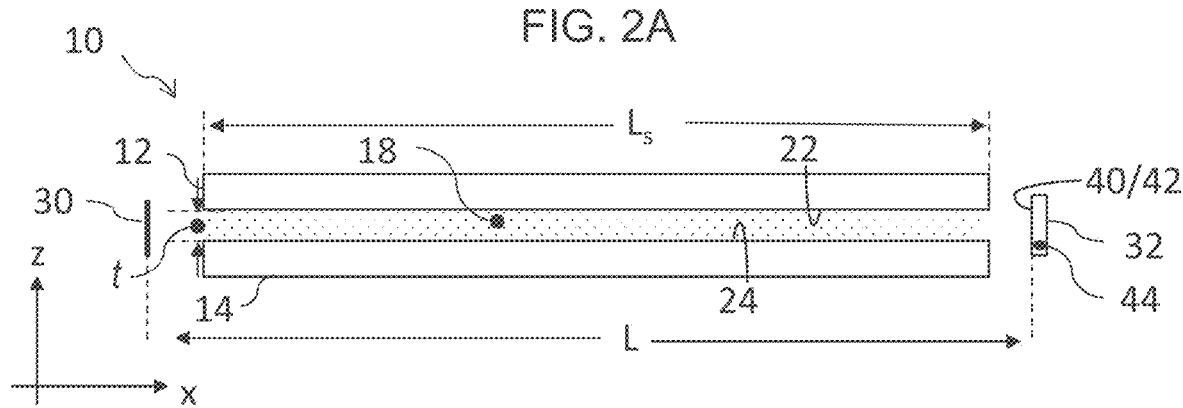

FIGS. 2A and 2B show schematically in plan and side view respectively an unstable resonator cavity laser 10 with a rounded-edge-to-facet front mirror 32 according to an embodiment of the invention. In FIG. 2A, not all the detail of the corresponding FIG. 1A is reproduced, but parameters which are not illustrated such as W1, W2 dc, a, g & M correspond to those in FIG. 1A. Like in FIGS. 1A and 1B, the laser of FIGS. 2A and 2B is a one-sided negative-branch hybrid-unstable cavity of a slab waveguide laser. As will be understood, a slab waveguide laser resonator of the one-sided negative-branch hybrid-unstable type has different waves propagating in each direction in respect of the free-space modes that exist across the slab width, namely a converging wave and a diverging wave. For hybrid unstable waveguide resonators, the free-space resonator modes supported in the slab width dimension are predominantly determined by the curvatures of the end mirrors along the width dimension, while the resonator mode in the slab height dimension is limited to a combination of waveguide modes, typically predominantly the fundamental EH11 resonator mode plus several higher-order waveguide modes. The front mirror 32 has a reflective surface coating arranged on a suitable substrate 46, e.g. made of crystalline silicon or copper.

The laser 10 comprises a cavity of length L defined by a rear mirror 30 and a front (output) mirror 32. The slab is formed by a first electrode 12 and a second electrode 14 having respective first and second mutually facing surfaces 22, 24 that are spaced apart by a gap of thickness 't'. The electrodes 12, 14 each have a width 'Ws' and a length 'Ls'. The gap of width 't' between the electrodes 12, 14 is dimensioned to allow a plasma discharge, shown schematically with the stippling 18, to be formed by applying a radio frequency, RF, electrical drive signal to at least one of the electrodes 12 and 14. The slab waveguide width and length 'Ws' and 'Ls' are close to the width 'W' and length 'L' of the resonator cavity. The cavity's resonator mirrors 30 and 32 of respective radii of curvature 'R1' and 'R2'. While the unstable resonator free-space beam intensity and phase information is propagated directly from the rear mirror to the front mirror in the slab width dimension, in the slab height dimension the end mirrors couple resonator modes right to their respective waveguide ends but do not control or impress a phase-front curvature on the waveguide modes directly. In the space between the ends of the waveguide and the cavity mirrors, the waveguide modes couple into free-space modes and then back into waveguide modes upon reentering the waveguide.

The magnification M=1/(1−c). The rear mirror radius of curvature R1=2L/(1+1/M). The front mirror radius of curvature R2=R1/M. The output coupling c=1−1/M with gap g=W1·c. The front mirror width W2=W1/M. The confocal condition is also met by this example, i.e. R1+R2=2L. Moreover, a=W1/M (1+M). The off-center condition is defined by dc=0.5·W1−M·a.

Geometrically, the confocal unstable resonator intracavity mode is comprised of a converging wave off the front mirror 32 that becomes a plane wave after reflecting off the confocal rear mirror 30, the plane wave extending over the full mirror width, W1, equaling or approximately equaling or exceeding the waveguide slab width Ws; and then propagating along the optical axis O/A towards the front output mirror 32. For a one-sided unstable resonator, a portion of this plane wave exits the resonator in the gap between one extreme of the slab width on one side and the edge of the front mirror 32 on the other side, thus forming a collimated laser output beam with a top-hat intensity profile. The remainder of the plane wave incident on the resonator cavity surface of the front (output) mirror 32 forms a converging wave upon reflection. For the confocal negative-branch unstable resonator, the converging wave comes to a focus at the confocal point in-between the rear and front resonator mirrors as illustrated. After passing through its focus, the converging wave becomes the diverging wave and propagates along the optical axis O/A to the rear mirror 30, thus completing the resonator round trip.

The rear mirror 30 is of width W1 and radius of curvature R1. The front mirror 32 (output mirror) is of width W2 and curvature R2. The cavity's optical axis O/A is off center by a distance 'dc' so that the rear mirror 30 has an extension on the output beam side of the optical axis O/A of 'a' and an extension on the side distal the output of M×a, where M is the magnification. The relative sizes of rear and front mirrors 30, 32 in the direction perpendicular to the optical axis and in the plane of the slab as well as the off-center arrangement of the front mirror 32 leaves a gap of width 'g' as viewed along the x direction for a portion of the beam to pass by the resonator cavity reflective surface 42 of the output mirror 32. As well as having a resonator cavity reflective surface 42, the front mirror 32 also has an output coupling reflective surface 44 which forms a continuation of the resonator cavity reflective surface 42, the two surfaces 42, 44 being joined by a rounded edge, which is also part of the same continuous mirror surface. The rounded-edge forming curved reflective surface 40 provides a smooth transition between the front mirror's resonator cavity surface and the output coupling reflective surface, thus avoiding a hard edge and suppressing the formation of diffraction ripples. In addition, the output coupling reflective surface 44 is angled and dimensioned so that the above-mentioned beam portion that couples out of the resonator cavity over the width 'g' is fully collected by the output coupling reflective surface 44, thereby missing its outer edge, there being an outer margin 'm' of the output coupling reflective surface 44 which is not optically active. The output coupling reflective surface 44 extends at an internal angle θ to the front mirror's resonator cavity reflective surface 42. By internal angle, we mean in relation to the body of the front mirror 32 including its substrate 46. The angle θ shown in FIG. 2A is an obtuse angle of 135° to provides an output beam that exits the cavity in the −y direction with width 'g'. Other obtuse angular values of the angle θ will of course result in the output coupling facet surface 44 directing the output beam 35 at an angle that deviates from the −y direction but retains a component in that direction. Within these variations of the angle θ, the output beam in this embodiment will be in the plane of the slab, i.e. in the xy-plane. In other embodiments, the output beam may be tilted relative to the xy-plane of the slab, i.e. with a non-zero z-component.

Figure 2C:
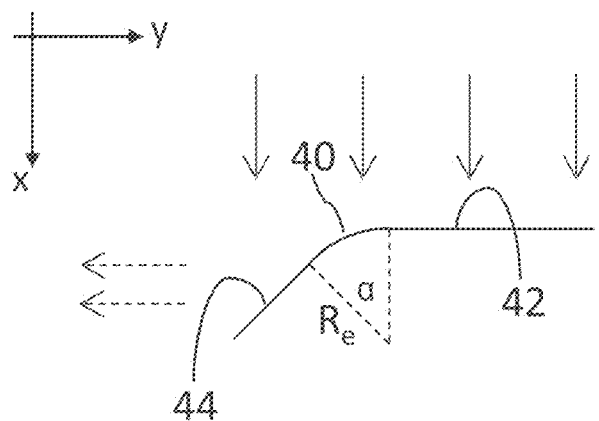
FIG. 2C shows in schematic section the geometrical relationship between the rounded edge and its adjoining mirror surfaces of the laser of FIGS. 2A and 2B.

FIG. 2C shows in schematic section the geometrical relationship between the rounded edge forming curved mirror surface 40 and its adjoining mirror surfaces 42 and 44. The resonator mirror surface 42 and output coupling facet surface 44 meet at an obtuse angle θ (see inset to FIG. 2A) with an edge 40. This edge 40 is rounded with a radius of curvature Re, where the rounded edge 40 describes an arc $\alpha=180-\theta$. The radius of curvature Re is carefully chosen, for example in relation to the lasing wavelength and the radius of curvature R2 of the output mirror (or more precisely that of its resonator mirror surface 42). Typical values for the radius of curvature, R2 will be 100 mm<R2<2000 mm. The radius of curvature of the rounded edge could be fabricated to be as low as 0.001 mm but could be much larger so that a typical range for Re is 0.001 mm<Re<0.01 mm. These ranges in combination mean that the ratio for R2/Re can be in the range 1000<R2/Re<2000000, but a more usual range might be narrower, e.g. with a lower limit of one of 1000, 1500 or 2000 and an upper limit of one of 0.1, 0.2, 0.5, 1.0, 1.5 or 2 million. We reference the obtuse angle θ to the yz-plane, so the rounded edge will in general not describe an arc of angle $\alpha=180-\theta$, since that requires the special case of the mirror surface 42 being planar (i.e. not concave or convex). In the illustrated example of a concave front mirror, the two surfaces will meet at an internal angle somewhat less than θ, whereas if the front mirror were convex, the two surfaces would meet at an angle somewhat greater than θ. The mirror substrate 46 is terminated at the distal end of the output coupling facet surface 44 with a sharp edge (see inset to FIG. 2A), but this is not relevant, since the facet surface 44 is made large enough in relation to the lateral edge of the waveguide that forms the other bound of the output, so that the beam is incident only on the width portion 'g' illustrated, leaving a margin 'm' which is not optically active. Solid arrows are used to show the beam incident on the output mirror and dashed arrows to show the output beam.

Figure 1D:
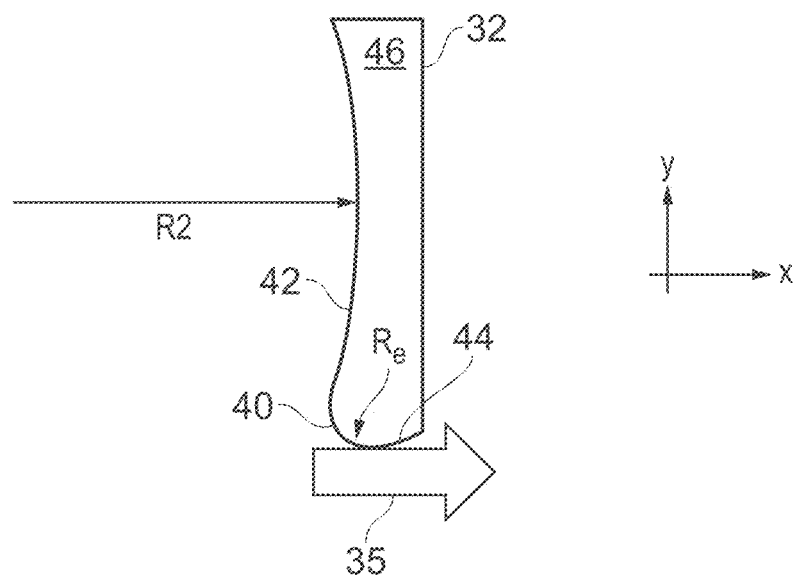
FIG. 1D is a schematic cross-section of a rounded-edge front mirror according to prior art design principles.
Figure 1E:
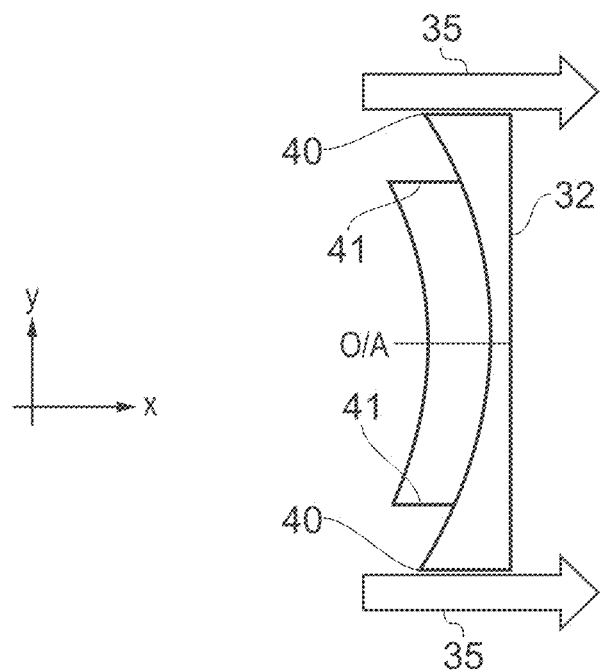
FIG. 1E is a schematic cross-section of a stepped output mirror according to a prior art design.
Figure 1F:
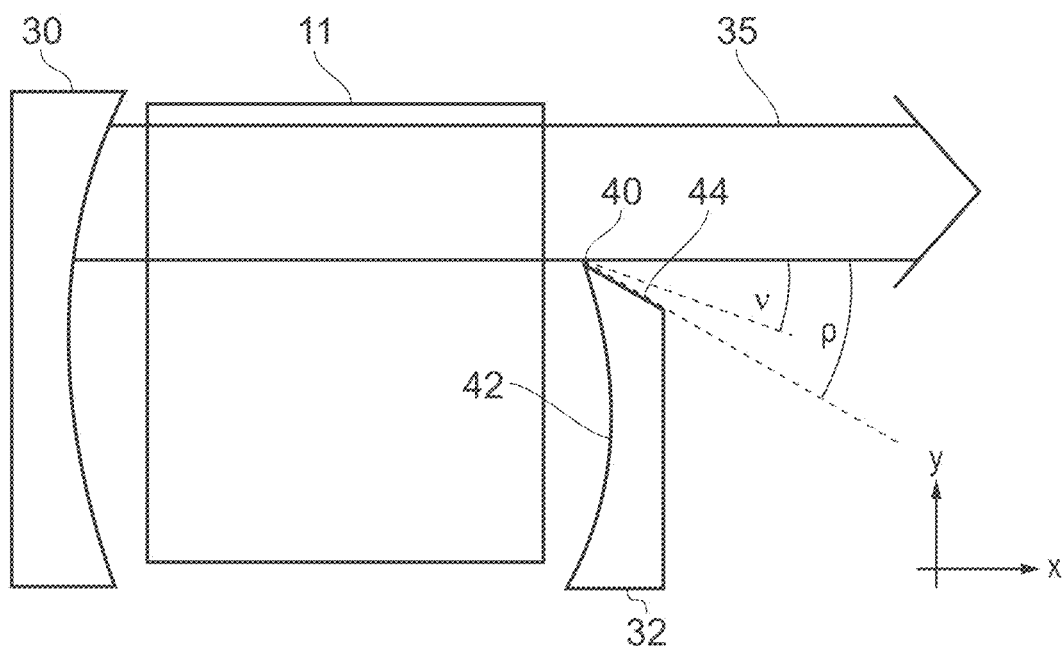
FIG. 1F is a schematic plan view of a slab waveguide laser with an extreme undercut output mirror according to a prior art design.

Providing the mirror facet surface 44 as an angled extension of the resonator mirror surface thus serves a dual purpose. First, it permits the provision of a diffraction-ripple suppressing rounded edge with any desired radius of curvature, so this important parameter can be freely set according to what is optimum for the design needs. For example, in our prototype test laser discussed further below, the rounding radius Re is about 0.1 mm and the mirror's radius of curvature R2 is about 800 mm giving a R2/Re value of about 8000. Second, the reflective facet surface serves to redirect the output laterally (e.g. by 90 degrees or some other angle that is desired). In addition, the fact that the junction is at an angle means that the rounded edge extends over a finite arc angle $\alpha=180-\theta$ which is less than 90°, since θ is an obtuse angle. By contrast, with a direct output of the beam past a rounded edge as in the prior art of FIG. 1D, the rounded edge must describe an arc angle $\alpha>90°$, since otherwise a hard edge will still be present where the rounded edge terminates. With this prior art design, there is thus a tangential intersection between the output beam and the lateral edge of the output mirror followed by an undercut surface 44 which could have an undesired influence on the output beam.

It is further noted that the facet surface 44 could be non-planar. For example, it may have an additional function of forming the first mirror in the beam-shaping optics for the output, so may be curved in a concave or convex manner, e.g. arcuately or parabolically.

We now describe various alternative embodiments with reference to FIGS. 3A to 3D, which are schematic cross-sections of different variants of the output mirror.

Figure 3A:
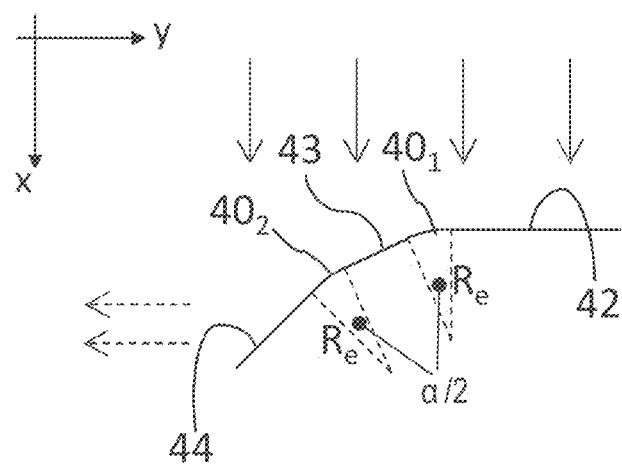
FIGS. 3A to 3D show in schematic section the output mirror in various alternative embodiments.

FIG. 3A shows in schematic section the geometrical relationship between the rounded edge forming curved surface and adjoining mirror surface of a variant. Rather than having the front mirror's resonator cavity reflective surface 42 and the output coupling reflective surface 44 joined by a single curved reflective surface 40 to form a rounded edge, in this variant the surfaces 42 and 44 are joined by two curved reflective surfaces $40_1$ $40_2$ with rounded edges which are themselves joined by an intermediate reflective surface facet 43, which is in this example planar, thereby creating a multi-faceted transition from the front mirror surface 42 to the output facet surface 44. For the same obtuse angle α between the surfaces 42 and 44 as in FIG. 2C, the arcs described by the two surfaces $40_1$ $40_2$ sum to α, for example each being α/2 as illustrated. It will be understood that more intermediate facets 43 could be provided in a similar fashion, so that each pair of adjacent rounded edges $40_n$ and $40_{n+1}$ would be joined by an intermediate facet 43.

Figure 3B:
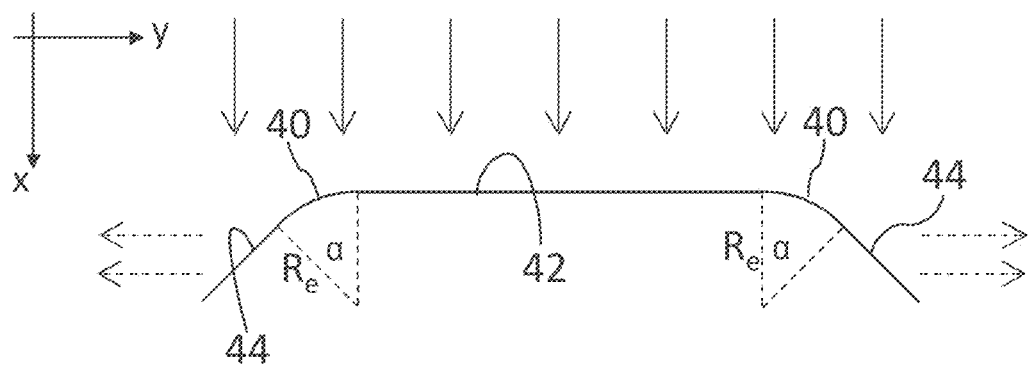

FIG. 3B shows in schematic section the geometry of a further variant that may be suitable for a slab laser, for example. Here two separate beam components are coupled out either side of the optical axis traveling in opposite directions as shown by the dashed arrows.

Another set of embodiments exist which may be viewed as optical equivalents to the above-described embodiments, but with the above-mentioned angles θ and a being external angles rather than internal angles. By external angle, we mean in relation to the body of the front mirror 32 including its substrate 46.

Figure 3C:
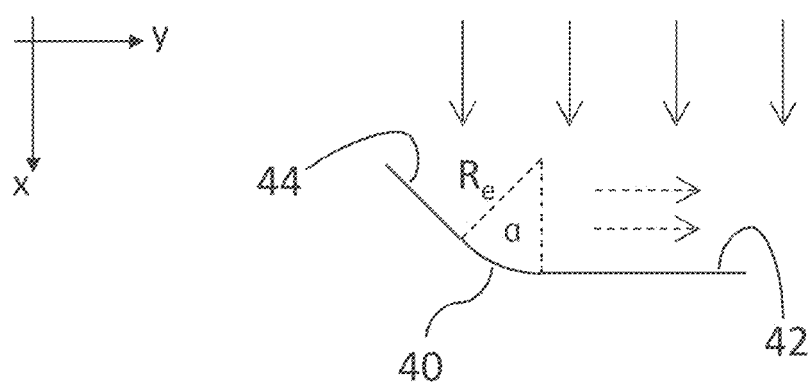

FIG. 3C shows an example of one such 'external angle' embodiment. Here it is seen that the output beam (dashed arrows) crosses over the optical axis in front of the front mirror on its way out of the laser resonator.

Figure 3D:
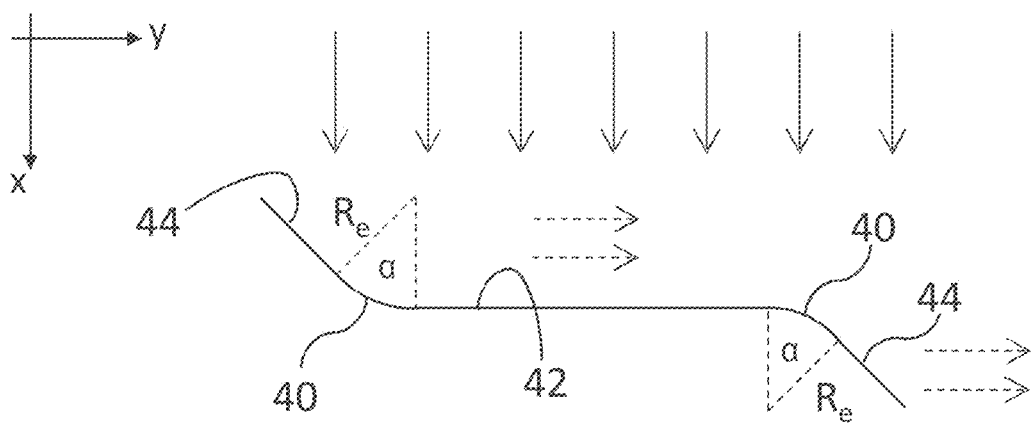

FIG. 3D shows a 'hybrid' embodiment in schematic section with one facet surface which is formed with an internal angle and another with an external angle. The output beam in this case is composed of two components (see two sets of dashed arrows) both traveling in the same direction, namely the component from the external angle facet surface 44 that crosses over the front mirror as in FIG. 3C, and the component from the internal angle facet surface 44 that exits as in the right-side of FIG. 3B. The two components are readily combinable into a single output beam.

It is further noted in the discussion of variants that, while we have used cross-sections and ordinary angles (not solid angles) to explain various embodiments, it will be understand that further complexity can be introduced in the three dimensions available, in particular in terms of shape and orientation of the output coupling reflective surface(s) and the rounded-edge forming curved surface(s), leading to further possible variants.

In the following, we present results from comparative testing of the beam quality output from a laser we designed and built with two different output mirrors which could be swapped out while leaving all other components unchanged, one according to an embodiment of the disclosure with a rounded edge and side facet and one with an undercut edge as in the prior art.

Figure 4A:
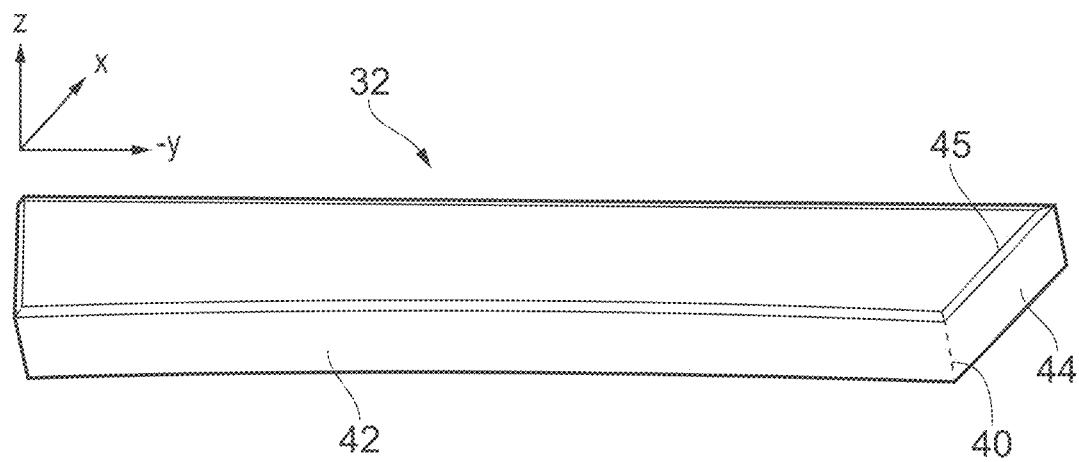
FIGS. 4A and 4B are perspective drawings of two output mirrors that were fabricated for comparative testing using the same test laser.
Figure 4B:
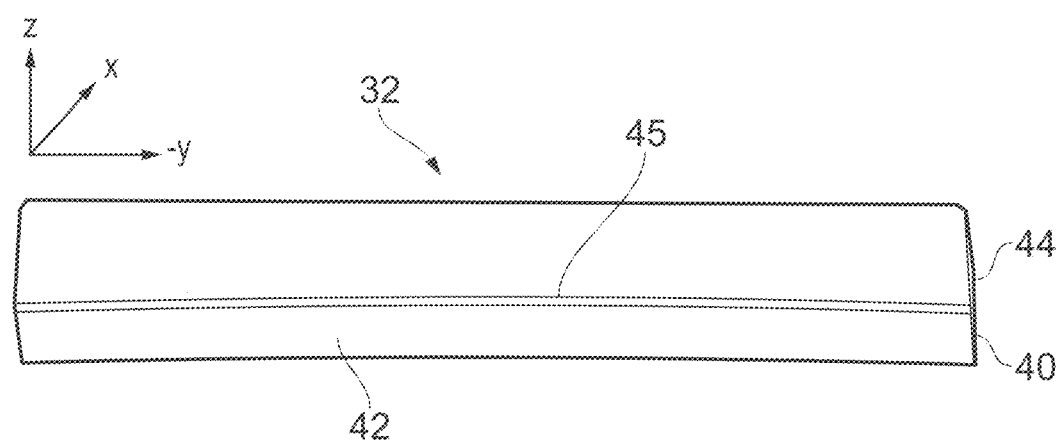

FIGS. 4A and 4B are perspective drawings of the output mirrors 32 that were fabricated for the testing with the output mirror of FIG. 4A being according to an embodiment of the disclosure and that of FIG. 4B as in the prior art shown in FIG. 1A. The labeling shows a bevel 45 as well as the previously mentioned features. The bevel is merely a practical feature to avoid a sharp mechanical edge and has no influence on laser performance, since it is outside the area that is optically active. The output mirror 32 of FIG. 4A has a cavity mirror surface 42, output coupling facet surface 44 and interconnecting rounded edge 40. The obtuse angle θ between the cavity mirror surface 42 (or more precisely the orthogonal to the optical axis at the front mirror) and the output coupling facet surface 44 was 135°. The output mirror 32 of FIG. 4B has a cavity mirror surface 42 which is identical to that of FIG. 4A, but the cavity mirror surface 42 terminates with a hard edge 40 formed at the intersection with a side surface 44 which has a 5° undercut as shown in the inset of FIG. 1A, i.e. the angle θ is acute.

Figure 5:
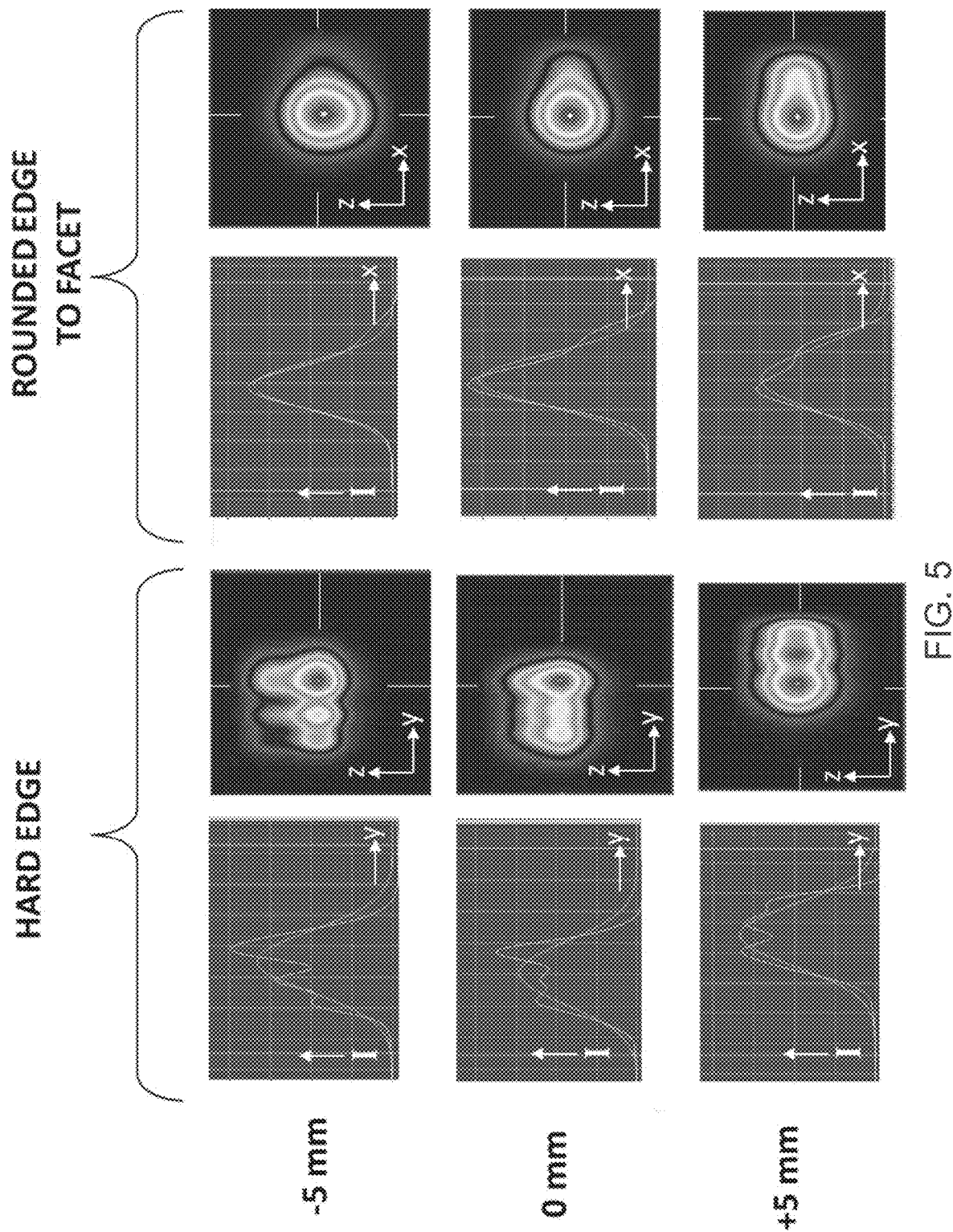
FIGS. 5 and 6 show comparative results from the test laser either fitted with the output mirror of FIG. 4A or that of FIG. 4B.
Figure 6:
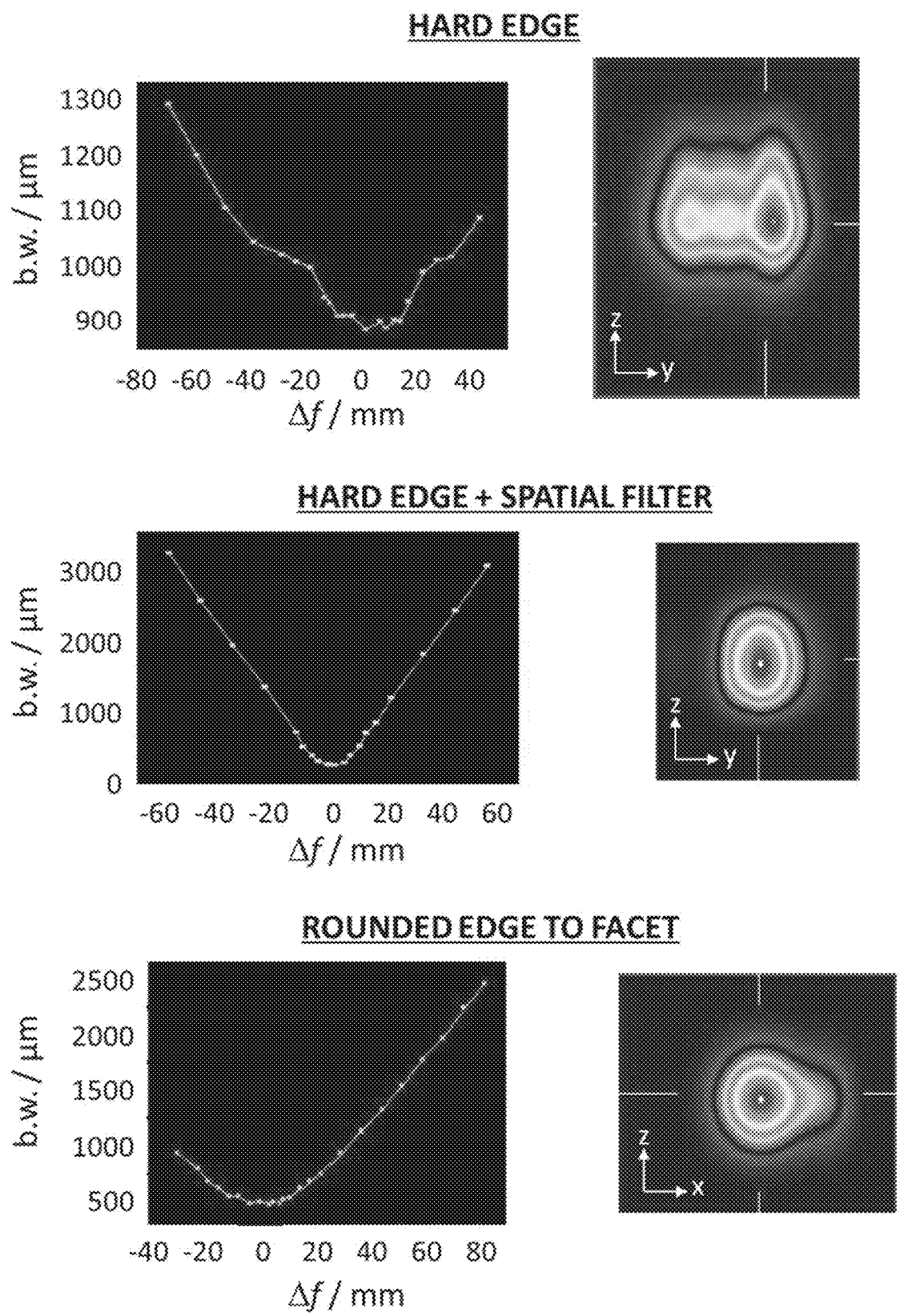

FIGS. 5 and 6 present results from the comparative testing of the beam quality output from our test laser with each of the above two mirrors. The results were measured by focusing the output beam with a 190 mm focal length lens. The test laser is a slab waveguide $CO_2$ laser with a one-sided negative-branch hybrid-unstable resonator, i.e. as shown in FIGS. 1A/2A and FIGS. 1B/2B. The two swappable output mirrors were made to the same optical specification. We were thus able to benchmark our output mirror concept against a conventional hard edge design, since any difference in performance could be solely attributed to the different output mirror designs. The direction of the output beam thus changed 90° when the output mirrors were exchanged, i.e. from the x direction for the hard-edge output mirror to the −y direction when the rounded-edge-to-facet front mirror was used.

FIG. 5 shows results from comparative testing of the quality of the focus of the output beam of the test laser— either fitted with the rounded-edge-to-side-facet front mirror of FIG. 4A (right half of FIG. 5) or the hard-edged, undercut output mirror of FIG. 4B (left half of FIG. 5). From top to bottom the three rows show results taken 5 mm before the focus of the output beam, at the focus (i.e. 0 mm), and 5 mm beyond the focus along the optical axis. Each of the graphs shows measured mode intensity T in arbitrary units across the width of the beam and a Gaussian best fit of the as-measured intensity profile. Each of the contour images is a 2D beam intensity profile of the output beam. These were, in original, color heat maps, but even when reproduced in grayscale for the present patent specification the mode profiles can be appreciated. As can be seen, the hard-edge diffraction ripples are responsible for the oversized and irregular focal spot size in the unstable (width) direction which would, in a laser cutting application for example, produce different kerf widths when cutting in different directions. Conversely, with the rounded-edge-to-facet front mirror of FIG. 4A, there is an absence of any significant diffraction ripples in the mode and the beam focal spot is smaller than with the hard-edged output mirror and quite a close approximation to circularly symmetric.

FIG. 6 shows more results from comparative testing of the quality of the focus of the output beam of the test laser. The top row of results is for the output beam as output from the test laser when fitted with the hard-edged mirror of FIG. 4B. The middle row is again for the test laser when fitted with the hard-edged front mirror but show the focal properties after the output beam has additionally been passed through a beam-shaping optical system with spatial filter. The bottom row is for the test laser when fitted with the front mirror of FIG. 4A. Each of the graphs is a plot of defocus position in millimeters through the focus of a 190 mm focal length lens versus beam width in micrometers, where beam width is in the y direction for the hard-edge output beam which is traveling in the x direction and in the x direction for the rounded-edge-to-facet output beam which is traveling in the −y direction. The data points were obtained by stepping a beam profiler along the optical axis in increments, the increments being 5-10 mm away from the focus and 1-2 mm close to the focus, thereby measuring the beam profile over a range of positions: before (minus); at (zero) and after (plus) the focus. At each step position, the beam width was measured. The contour images are as in FIG. 5, i.e. they show 2D beam intensity profiles of the output beam.

FIG. 6 in the top row shows a hard-edge resonator laser output mode intensity profile from the output mirror of FIG. 4B. The profile is clearly asymmetric and oversized with pronounced intensity ripples derived from the hard-edge diffraction ripples described above. In this case the unstable resonator mode in the width dimension has a focus that is approximately 900 μm wide (see the minimum of the curve in the graph on the left of the top row). FIG. 6 in the middle row shows the hard-edge resonator laser output mode of the top row after the output beam has passed through a beam-shaping optical system with spatial filtering similar to those described by Xiao et al [ibid]. The mode intensity profile is near-symmetric, since the diffraction intensity ripples and higher-order mode content are filtered out. In this case, the unstable resonator mode is approximately 450 μm wide at the focus (see the minimum of the curve in the graph on the left of the middle row) which is about half that for the unfiltered case (see graph on top row). The effects of the diffraction ripples generated by the hard edge on the beam size can also be seen in the measured beam width vs. position through the lens focus, as seen in the graph on the top row of FIG. 6. The beam size can be seen to vary erratically with distance along the optical axis, especially near the focus (zero position). This is either a direct result of the diffraction ripples off the hard-edged output mirror hard-edge that point in the direction of the output beam super-imposed on the output beam as it exits passed the hard-edge output mirror, or an indirect result caused by the diffraction ripples off the hard-edged output mirror hard-edge that point in the opposite direction to the output beam back into the resonator, exciting higher-order unstable resonator modes, which then contribute to the output beam.

FIG. 6 in the middle row shows results after spatially filtering the output from the front mirror of FIG. 4B. As a result of the spatial filtering, the beam width as a function of distance along the optical axis is now a smooth function (see graph in middle row). The same is true for the test laser when fitted with the front mirror of FIG. 4A, as can be seen from the bottom row graph, since this output mirror design avoids diffraction ripples from appearing. In this case, the beam shaping is achieved with a single, low-cost cylindrical lens. The mode is approximately 500 μm wide at the focus in the unstable resonator (i.e. width) dimension, consistent with a near-diffraction-limited beam (see bottom row graph). The focus is thus nearly as tight as for the spatially filtered output of the hard-edge output mirror shown in the middle row graph.

Apart from added cost, the use of beam shaping is also not desired, since the improvement in beam quality comes at the expense of reduced laser power and reduced power stability, as can be seen from the measurement results presented in the table below. Typically, 10-25% of the laser power is lost with the introduction of spatial filtering. The laser power instability with a spatial filter arises, because a spatial filter is based on placing a slit or pinhole at the focus between two lenses or mirrors. As the laser will have some inherent opto-mechanical-induced pointing instability in its output, the focus at the slit or pinhole will wander and cause time-varying losses as different amounts of the beam are clipped at the slit or pinhole. By contrast, with the rounded-edge-to-facet front mirror in a slab waveguide laser, all that is usually needed for shaping the output beam is a simple, low cost cylindrical lens to transform the nominally highly elliptical beam output from the slab (e.g. aspect ratio of 5 to 10 or more) to a nominally circular cross-section beam, i.e. in practice to transform the output beam into one with an aspect ratio of approximately unity. The same cylindrical lens can also be used to collimate the beam (or bring it to a desired focus) as desired by arranging it at a suitable position along the optical axis of the output beam.

The following table summarizes our measurements of laser output power and power stability for the three sets of results shown in FIG. 6.

| Output Mirror & Beam Shaping | Laser Power & Power Stability |
| --- | --- |
| Hard edge without spatial filtering | Mean Power: 653 W Standard Deviation: 10.2 W Power Stability = 1.6% |
| Hard edge with spatial filtering | Mean Power: 567 W Standard Deviation: 17.4 W Power Stability = 3.1% |
| Rounded edge to facet without spatial filtering | Mean Power: 661 W Standard Deviation: 8.0 W Power Stability = 1.2% |

Figure 7:
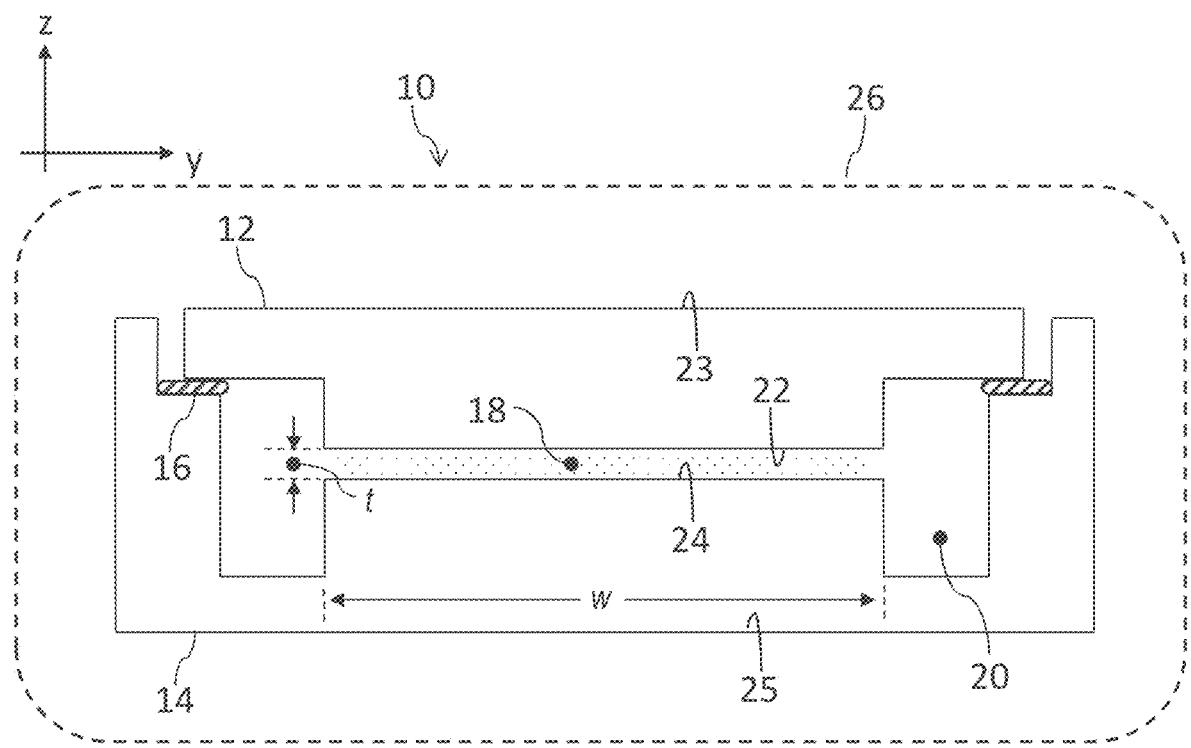
FIG. 7 is a schematic cross-section through a section part way along the slab of FIGS. 2A and 2B.

FIG. 7 is a schematic cross-section through a section part way along the slab of FIGS. 2A and 2B. It is shown how the first and second electrodes 12 and 14 are used to form a vacuum enclosure. The vacuum enclosure comprises a first part that is integral with the first electrode 12 and a second part that is integral with the second electrode 14. The first and second electrodes 12 and 14 have their respective, mutually facing internal surfaces 22 and 24 inside the vacuum enclosure and their respective external surfaces 23 and 25 outside the vacuum enclosure. The first part of the vacuum enclosure has the form of a lid and the second part has the form of a box, the lid and box together forming a sealed container defining the vacuum enclosure. The lid is electrically isolated from the box by a vacuum gasket 16 made of electrically insulating material, e.g. a suitable synthetic rubber or fluoropolymer elastomer. A gas reserve volume 20 is provided along each side of the slab to ensure good supply of gas to the gap region during operation. An RF outer shield 26 is also schematically illustrated. The RF shield 26 is arranged to surround the slab, i.e. the first and second electrodes, and is connected to an electrical ground. An RF outer shield may be needed to comply with EMI regulations, even if not needed for any functional reason. If both electrodes are driven with RF, which is one possible drive option, then the RF shield can provide the return path to ground for both electrodes. That is, in some embodiments, the first electrode can be an RF electrode and the second electrode grounded, whereas in other embodiments both electrodes could be RF electrodes with their RF drives out of phase and with the return path via a separate ground, such as the RF shield.

Figure 8:
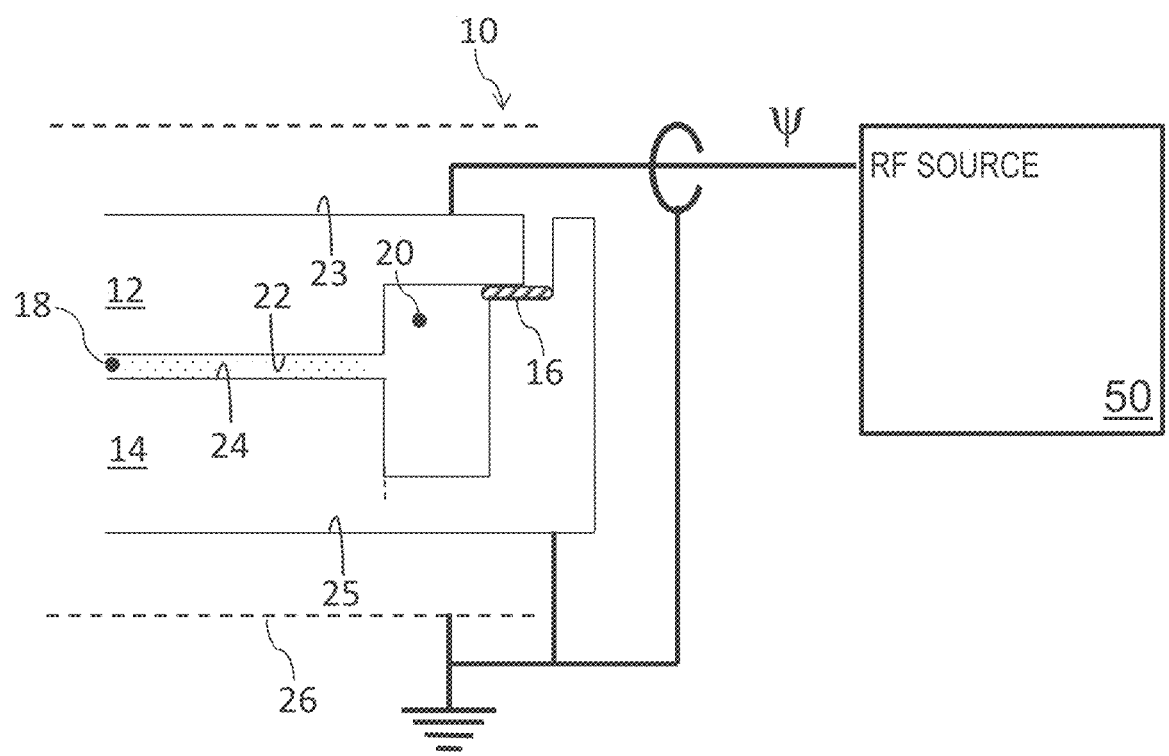
FIG. 8 is a schematic drawing showing electrical drive connections to the slab waveguide laser shown in FIG. 7.

FIG. 8 is a schematic drawing showing one possible electrical drive connection arrangement to the slab waveguide laser as shown in FIG. 7. An RF source 50 is used to supply an RF drive current of waveform 'ψ' to the external surface 23 of the first, lid electrode 12 while the second, box electrode 14, and also the RF shield 26, are connected to electrical ground. The RF source 50 thus supplies an RF electrical drive signal to the first electrode 12 to generate the plasma discharge 18 in the slab.

Figure 9:
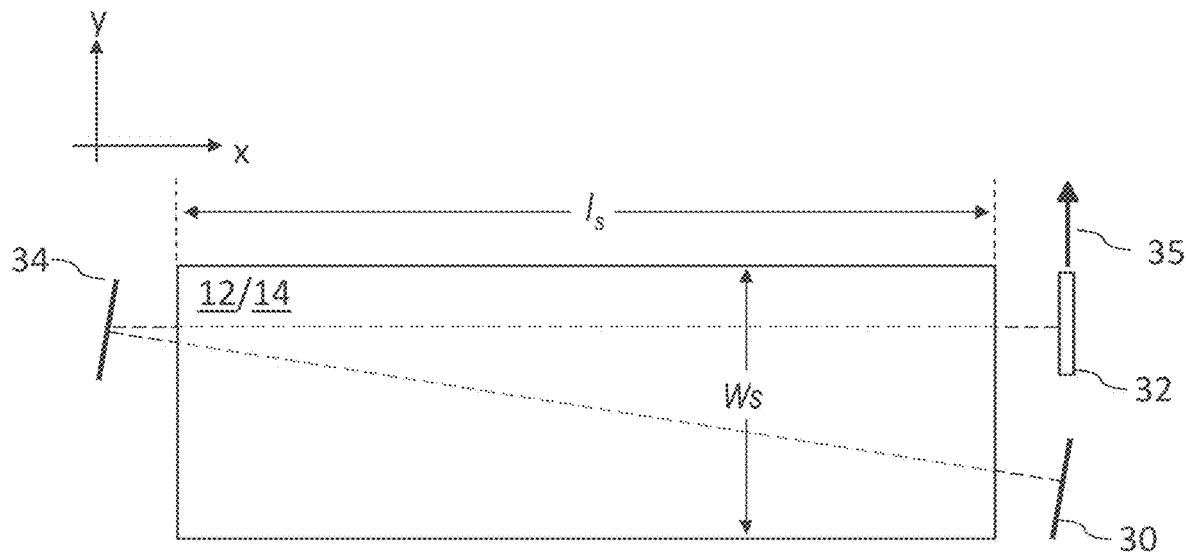
FIG. 9 is a schematic plan view of a slab waveguide laser according to a further embodiment with a V-fold cavity formed in a single slab.

FIG. 9 is a schematic plan view of a slab waveguide laser according to a further embodiment with a V-fold cavity formed in a single slab. The rear mirror 30 and output mirror 32 are now arranged at the same end of the slab alongside each other and a fold mirror 34 is arranged at the other end of the slab, with the fold mirror 34 and rear mirror 30 tilted by suitable amounts to support the desired lasing mode(s) resonator optical axis. This V-fold configuration with one cavity folding mirror 34 provides the resonator cavity with one additional forward and backward slab traversal, per cavity round trip, i.e. four traversals compared to two for a round trip of a simple cavity with no fold mirrors. The single fold thus passes the beam path back through the single slab an extra time with the V-fold extending in the free-space dimension of the slab, i.e. in the plane of the slab.

Figure 10:
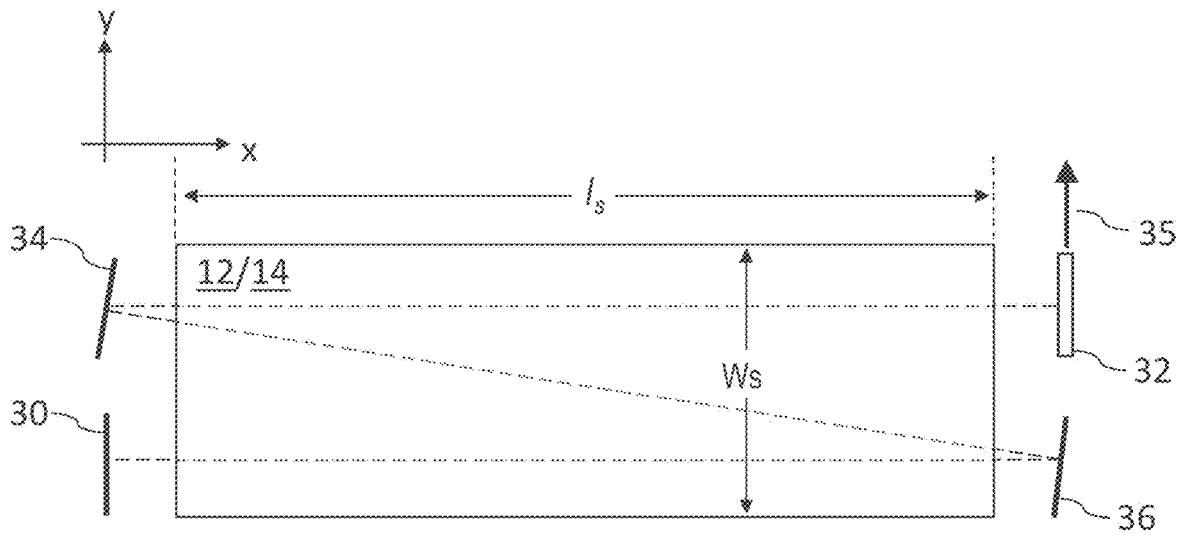
FIG. 10 is a schematic plan view of a slab waveguide laser according to a further embodiment with a Z-fold cavity formed in a single slab.

FIG. 10 is a schematic plan view of a slab waveguide laser according to a further embodiment with a Z-fold cavity formed in a single slab. The rear mirror 30 and output mirror 32 are arranged at different ends of the slab, with the first fold mirror 34 being arranged alongside the rear mirror 30 and the second fold mirror 36 arranged alongside the output mirror 32. The fold mirrors 34 and 36 are tilted by suitable amounts to support the desired lasing mode(s) resonator optical axis. The resonator cavity is thus defined by the output mirror 32, first fold mirror 34, second fold mirror 36 and rear mirror 30. The cavity's round trip beam path traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively. This Z-fold configuration with first and second cavity folding mirror 34 and 36 provides the resonator cavity with two additional forward and backward slab traversals, per cavity round trip, i.e. 6 traversals. The two folds thus pass the beam path back and forth through the single slab with the Z-fold extending in the free-space dimension of the slab, i.e. in the plane of the slab.

Further embodiments may have more folds, e.g. a fold arrangement in the shape of an epsilon Σ. Moreover, other folded cavity designs may be based on fold mirror assemblies that couple between different slabs, e.g. arranged on top of one another in a stack, rather than fold mirrors that use a common slab as illustrated above.

Figure 11:
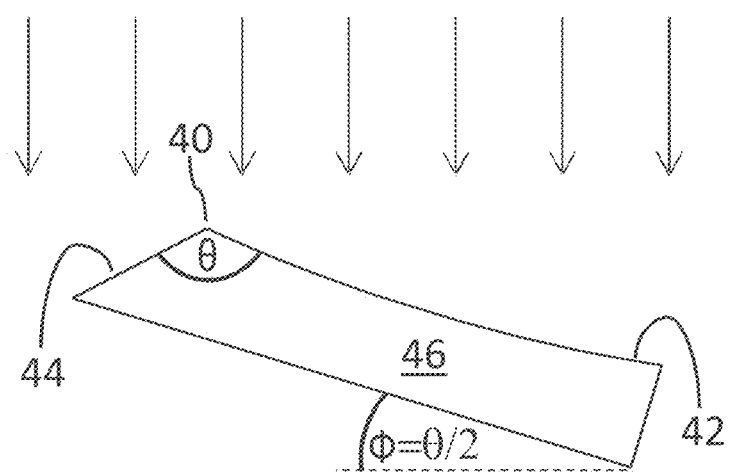
FIG. 11 is a schematic drawing showing the process of mirror coating a front mirror according to embodiments of the invention.

FIG. 11 is a schematic drawing showing the coating of an output mirror substrate 46 in a coating chamber in order to deposit the reflective mirror coating onto a mirror blank, i.e. the substrate. The deposition in a conventional vapor deposition chamber is in essence unidirectional as shown schematically by the parallel arrows. The main cavity mirror surface 42 of the output mirror is labeled as well as the facet mirror surface 44 for coupling out the output beam and the interconnecting curved edge 40. The cavity mirror surface 42 is illustrated as being concave, but in other embodiments the cavity mirror surface 42 may be convex or even planar. The mirror blank 46 is arranged in the deposition chamber to be tilted by an angle $\phi$, which is set to half the obtuse angle $\theta$ formed between the facet mirror surface 44 and the cavity mirror surface 42, relative to the perpendicular of the deposition direction. This arrangement ensures that the facet mirror surface 44 and the cavity mirror surface 42 are both tilted relative to the normal to the deposition direction by equal magnitudes, i.e. the obtuse angle $\theta$ is bisected by the deposition direction. This compromise allows a good quality mirror surface to be deposited in a conventional deposition process. This approach avoids having to deposit the mirror surfaces for the facet 44 and the cavity mirror surface 42 in separate depositions which could lead to non-uniform reflectivity and/or physical discontinuities (e.g. local accumulations, pits, spikes, ridges, beads etc.) being formed at the critical area of the rounded edge 40. The various reflective surfaces 42, 40, 44 are thus formed as a smooth continuum by depositing the mirror coating in one deposition over the area of surfaces 42, 40 and 44.

It will be clear to one skilled in the art that many improvements and modifications can be made to the foregoing exemplary embodiment without departing from the scope of the present disclosure.

What is claimed is:

1. A laser resonator comprising a front mirror and a rear mirror with respective resonator cavity reflective surfaces which in cooperation form an unstable resonator cavity with a principal optical axis, wherein the front mirror further comprises:
   an output coupling reflective surface which couples out an output beam from the laser resonator by reflection and which forms a continuation of the front mirror's resonator cavity reflective surface; and
   a curved reflective surface having a rounded edge that forms a smooth transition between the front mirror's resonator cavity surface and the output coupling reflective surface that suppresses formation of diffraction ripples.

2. The laser resonator of claim 1, wherein the rounded edge is arcuate in cross-section.

3. The laser resonator of claim 2, wherein the front mirror's resonator cavity reflective surface has a radius of curvature R2 and the rounded edge has a radius of curvature Re and the ratio R2/Re is in a range between one thousand and two million; $1\,000 < R2/Re < 2\,000\,000$.

4. The laser resonator of claim 1, wherein the output coupling reflective surface extends at an internal angle to the front mirror's resonator cavity reflective surface which is in a range selected from one of: 135±40°, 135±35°, 135±30°, 135±25°, 135±20°, 135±15°, 135±10°, 135±5°, 135±2° and 135±1°, where an internal angle of 135° is defined as one which provides an output beam direction following reflection from the output coupling reflective surface that is orthogonal to the optical axis of the resonator cavity at the front mirror and away from the optical axis of the resonator cavity at the front mirror.

5. The laser resonator of claim 1, wherein the rounded edge describes an internal angle in a range selected from one of: 45±40°, 45±35°, 45±30°, 45±25°, 45±20°, 45±15°, 45±10°, 45±5°, 45±2° and 45±1°.

6. The laser resonator of claim 4, wherein the rounded edge describes an internal angle in a range selected from one of: 45±40°, 45±35°, 45±30°, 45±25°, 45±20°, 45±15°, 45±10°, 45±5°, 45±2° and 45±1°.

7. The laser resonator of claim 1, wherein the output coupling reflective surface extends at an external angle to the front mirror's resonator cavity reflective surface which is in a range selected from one of: 135±40°, 135±35°, 135±30°, 135±25°, 135±20°, 135±15°, 135±10°, 135±5°, 135±2° and 135±1°, where an external angle of 135° is defined as one which provides an output beam direction following reflection from the output coupling reflective surface that is orthogonal to the optical axis of the resonator cavity at the front mirror and towards the optical axis of the resonator cavity at the front mirror.

8. The laser resonator of claim 1, wherein the rounded edge describes an external angle in a range selected from one of: 45±40°, 45±35°, 45±30°, 45±25°, 45±20°, 45±15°, 45±10°, 45±5°, 45±2° and 45±1°.

9. The laser resonator of claim 7, wherein the rounded edge describes an external angle in a range selected from one of: 45±40°, 45±35°, 45±30°, 45±25°, 45±20°, 45±15°, 45±10°, 45±5°, 45±2° and 45±1°.

10. The laser resonator of claim 1, wherein the front mirror's resonator cavity and output coupling reflective surfaces are joined by a single curved reflective surface.

11. The laser resonator of claim 1, further comprising at least one further curved reflective surface, each curved reflective surface having a rounded edge, the plurality of curved reflective surfaces forming a transition between the front mirror's resonator cavity surface and the output coupling reflective surface, the or each pair of adjacent curved reflective surfaces being joined by a facet reflective surface.

12. The laser resonator of claim 1, further comprising a slab waveguide arranged in the resonator cavity so that the front and rear mirror's resonator cavity reflective surfaces couple at least one resonator mode between the front and rear mirrors and the slab waveguide.

13. The laser resonator of claim 12, wherein the slab waveguide is arranged in relation to the output coupling reflective surface of the front mirror so that radiation coupled out of the laser via the output coupling reflective surface is laterally confined to be incident upon the output coupling reflective surface and thereby avoid being incident on an outer edge of the output coupling reflective surface.

14. The laser resonator of claim 12, wherein the front mirror further comprises a second output coupling reflective surface arranged on the other side of the optical axis at the front mirror compared to the first-mentioned output coupling reflective surface, the second output coupling reflective surface forming a continuation of the front mirror's resonator cavity reflective surface; and a second curved reflective surface having a second rounded edge that forms a transition between the front mirror's resonator cavity surface and the second output coupling reflective surface.

\* \* \* \* \*